(12) United States Patent
Caliskan

(10) Patent No.: US 10,556,625 B2
(45) Date of Patent: Feb. 11, 2020

(54) EXTRUDED B-PILLAR REINFORCEMENT

(71) Applicant: FORD GLOBAL TECHNOLOGIES, LLC, Dearborn, MI (US)

(72) Inventor: Ari Garo Caliskan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 26 days.

(21) Appl. No.: 15/893,836

(22) Filed: Feb. 12, 2018

(65) Prior Publication Data

US 2019/0248420 A1 Aug. 15, 2019

(51) Int. Cl.
*B62D 25/04* (2006.01)
*B62D 65/00* (2006.01)

(52) U.S. Cl.
CPC ............. *B62D 25/04* (2013.01); *B62D 65/00* (2013.01)

(58) Field of Classification Search
CPC ................................ B62D 65/00; B62D 25/04
See application file for complete search history.

(56) References Cited

U.S. PATENT DOCUMENTS

| 5,941,597 A * | 8/1999 | Horiuchi | B62D 25/04 296/193.06 |
|---|---|---|---|
| 6,217,109 B1 | 4/2001 | Okana et al. | |
| 8,272,682 B2 | 9/2012 | Cimatti | |
| 2008/0106123 A1 * | 5/2008 | Lakic | B62D 25/04 296/205 |
| 2017/0096171 A1 | 4/2017 | Frost et al. | |

\* cited by examiner

*Primary Examiner* — D Glenn Dayoan
*Assistant Examiner* — Melissa Ann Bonifazi
(74) *Attorney, Agent, or Firm* — Vichit Chea; Brooks Kushman P.C.

(57) ABSTRACT

A pillar for a vehicle is disclosed that includes an outer panel, an inner panel, and an extruded reinforcement attached between the inner and outer panels. The reinforcement extends from an upper end of the inner panel to a striker attachment area on the outer panel. A lower end of the reinforcement is trimmed to be spaced from the inner panel. The inner panel may be full height of the pillar or may extend from the rocker to the striker area where the inner panel overlaps the reinforcement. The reinforcement above the striker area may function as the inner panel above the striker area. A method is disclosed for making a B-pillar for a vehicle.

15 Claims, 3 Drawing Sheets

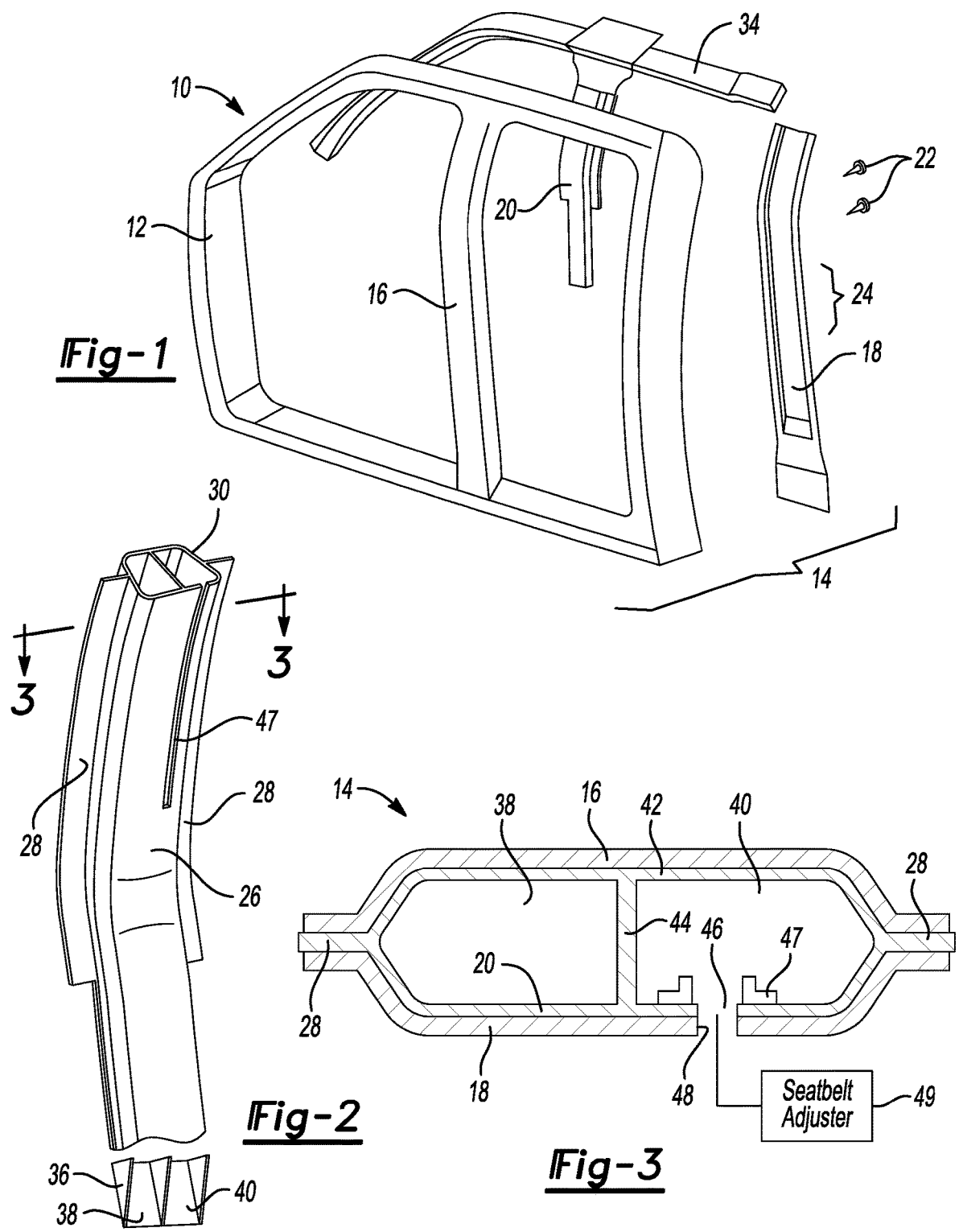

EXTRUDED B-PILLAR REINFORCEMENT

TECHNICAL FIELD

This disclosure relates to vehicle pillars that support the roof of a vehicle and, more particularly to the structure of a B-pillar.

BACKGROUND

Reducing the weight of a vehicle is important to meet fuel economy standards and to offset the weight of additional vehicle content required for electric vehicles and autonomous vehicles. One area where weight may be reduced is in the body structure of a vehicle.

A B-pillar is one part of the body structure that must withstand roof strength and side impact collision requirements. A B-pillar generally includes an outer panel that is a class-A painted outer vehicle surface and an inner panel attached to the outer panel. A doubler may be provided in the upper portion of the B-pillar that is a single thickness, formed sheet metal part attached to the inner panel between the inner and outer panels. The material, size, and thickness of the doubler is tuned to meet vehicle weight and load bearing requirements. The single thickness doubler adds weight and limits the weight reduction that may be achieved for a B-pillar.

This disclosure is directed to solving the above problems and other problems as summarized below.

SUMMARY

According to one aspect of this disclosure, a pillar for a vehicle is provided that includes an outer panel, an inner panel, and a reinforcement attached between the inner and outer panels. The reinforcement extends from an upper end of the inner panel to a striker attachment area on the outer panel. A lower end of the reinforcement is spaced from the inner panel.

According to other aspects of this disclosure, the reinforcement may define a plurality of closed cells with a plurality of walls extending in a vertical direction between the lower end of the reinforcement and an upper end of the reinforcement. The lower end of the reinforcement may be trimmed at an angle from an outer side of the lower end of the reinforcement proximate the outer panel to an intermediate location on an inner side of the reinforcement proximate the inner panel. The closed cells at the lower end of the reinforcement may be open on an inner side of the reinforcement.

The pillar may further comprise a front flange extending forward of a body portion of the reinforcement and a rear flange extending rearward from the body portion. The front flange and the rear flange may extend from the upper end of the reinforcement to an intermediate location on the reinforcement above the striker attachment area on the outer panel.

According to other aspects of this disclosure, a pillar for a vehicle is disclosed that comprises an outer panel and an inner panel extending from a lower end of the inner panel to an upper end at a first height of a top of a striker attachment area of the outer panel. A reinforcement is attached between the inner and outer panels. The reinforcement extends from an upper end of the inner panel to a lower end at a second height of a bottom of the striker attachment area on the outer panel. A lower end of the reinforcement overlaps the upper end of the inner panel.

The reinforcement above the upper end of the inner panel is joined to the outer panel and wherein the inner panel does not extend above the first height.

The pillar may further comprise a junction bracket attached to the upper end of the reinforcement panel that is adapted to be attached to a roof rail of the vehicle.

The reinforcement may define a plurality of closed cells with a plurality of walls extending in a vertical direction between the lower end of the reinforcement and an upper end of the reinforcement. The lower end of the reinforcement may be trimmed at an angle from an outer side of the lower end of the reinforcement proximate the outer panel to an intermediate location on an inner side of the reinforcement proximate the inner panel. The closed cells at the lower end of the reinforcement are open on an inner side of the reinforcement.

According to another aspect of this disclosure, a method is disclosed for making a B-pillar for a vehicle. The method includes the steps of forming an inner panel and an outer panel in a sheet metal forming operation. Extruding a reinforcement with closed cells extending the length of the reinforcement. The outer panel is assembled to a side body structure of the vehicle. The reinforcement is then assembled to an upper portion of the inner panel with the upper portion extending from a top end of the inner panel to a striker receiving area of the outer panel. The inner panel and reinforcement are then assembled to the outer panel.

According to other aspects of the disclosed method, the method may further comprise bending the reinforcement to the contour of the upper portion of the inner panel. At least one flange extruded on the reinforcement may be trimmed to conform to the width of the inner panel in the fore-and-aft vehicle direction. The reinforcement may be riveted or otherwise fastened with a one-sided fastener to the inner panel.

The method may further comprise forming a junction bracket in a sheet metal forming operation, and assembling the reinforcement to the junction bracket.

The above aspects of this disclosure and other aspects will be described below with reference to the attached drawings.

BRIEF DESCRIPTION OF THE DRAWINGS

FIG. 1 is an exploded perspective view of a side body assembly of a vehicle having a B-pillar assembly made according to one aspect of this disclosure.

FIG. 2 is a perspective view of a B-pillar reinforcement.

FIG. 3 is a cross-section taken along the lines 3-3 in FIG. 2.

DETAILED DESCRIPTION

Figure 4:
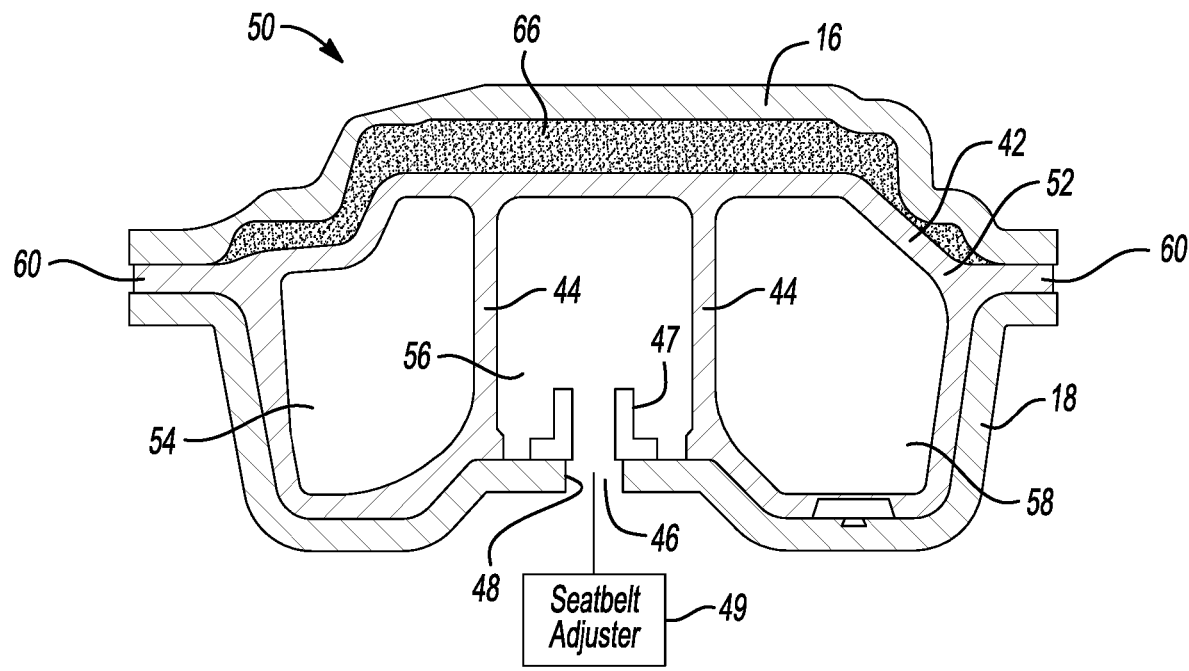
FIG. 4 is a cross-section of an alternative embodiment of a B-pillar reinforcement.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, a vehicle 10 is partially shown including the portion of the vehicle 10 comprising the side body assembly 12. A B-pillar assembly 14 is shown with the parts of the B-pillar assembly 14 separated including an outer panel 16, an inner panel 18, and an extruded reinforcement 20. The extruded reinforcement 20 does not extend the full length of the outer panel 16 and inner panel 18 but instead is adapted to reinforce the upper portion of the B-pillar assembly 14. The extruded reinforcement 20 and inner panel 18 are secured together by means of one-side access fasteners 22. The fasteners 22 may be Rivtac® (a registered trademark of Böllhoff Systemchnik GmbH, Germany) fasteners, flow drill screws, or rivets that are received through the inner panel 18 and side flanges 28 of the reinforcement 20. The reinforcement 20 extends downwardly to the striker attachment area 24 of the B-pillar assembly 14.

Referring to FIG. 2, the extruded reinforcement 20 is illustrated in isolation. The reinforcement 20 includes an upper end 30 and a lower end 32. The upper end 30 of the reinforcement 20 is attached to the roof rail 34, as shown in FIG. 1. The lower end 32 of the reinforcement 20 is cut away at the lower end 32 to provide clearance for the striker that is attached to the inner panel 18.

Referring to FIG. 3, the B-pillar assembly 14 is shown assembled together with the outer panel 16 and the inner panel 18 being assembled to opposite sides of the extruded reinforcement 20. The reinforcement 20 includes a front cell 38 and a rear cell 40 that are hollow areas within the reinforcement 20 that extend from the upper end 30 to the lower end 32 of the reinforcement 20. The outer panel 16, inner panel 18 and reinforcement 20 are joined through the side flanges 28 of the reinforcement 20 by the fasteners 22 (shown in FIG. 1). The front cell 38 and rear cell 40 are formed by a peripheral wall 42 that extends around the front cell 38 and the rear cell 40. An internal wall 44 is shown in FIG. 3 that reinforces the peripheral wall 42 and provides additional strength to resist impact forces applied to the B-pillar assembly 14.

A seat belt adjuster slot 46 is formed in the rear cell of the reinforcement 20. An adjuster track 47 is assembled inside the reinforcement 20 and an inner panel slot 48 is aligned with the seat belt adjuster slot 46. A seat belt adjuster 49 is shown diagrammatically in FIG. 3 and is assembled through the seat belt adjuster slot 46 and inner panel slot 48 and is attached to the adjuster track 47.

Referring to FIG. 4, an alternative embodiment of a B-pillar assembly 50 is shown that includes a reinforcement 52 that has three cells 52. The three cells include a front cell 54, a central cell 56 and rear cell 58. The reinforcement 52 includes side flanges 60 to which the outer panel 16 and inner panel 18 are attached by one-sided fasteners (shown in FIG. 1). The reinforcement 52 defines a seat belt adjuster slot 62 that is aligned with an inner panel slot 64. The seat belt adjuster track 47 is provided inside the central cell 56. The seat belt adjuster 49 is secured to the track 47 in a manner similar to the seat belt adjuster 49, as shown in FIG. 3. The embodiment shown in FIG. 4 includes the peripheral wall 42 and two internal walls 44 that divide the front cell 54 and rear cell 58 from the central cell 56. An adhesive 66 is applied between the outer panel 16 and the reinforcement 52.

The extruded reinforcement 20 and three cell reinforcement 52 are extruded parts. The reinforcements 20 and 52 are aluminum extrusions that are formed as a curved aluminum extrusion that follows the shape of the upper portion of the B-pillar assembly 14 or B-pillar assembly 50. The side flanges 60 are trimmed to match the width of the inner panel 18. The seat belt adjuster slot 46 is subsequently cut by metal machining or cutting operations.

Figure 5:
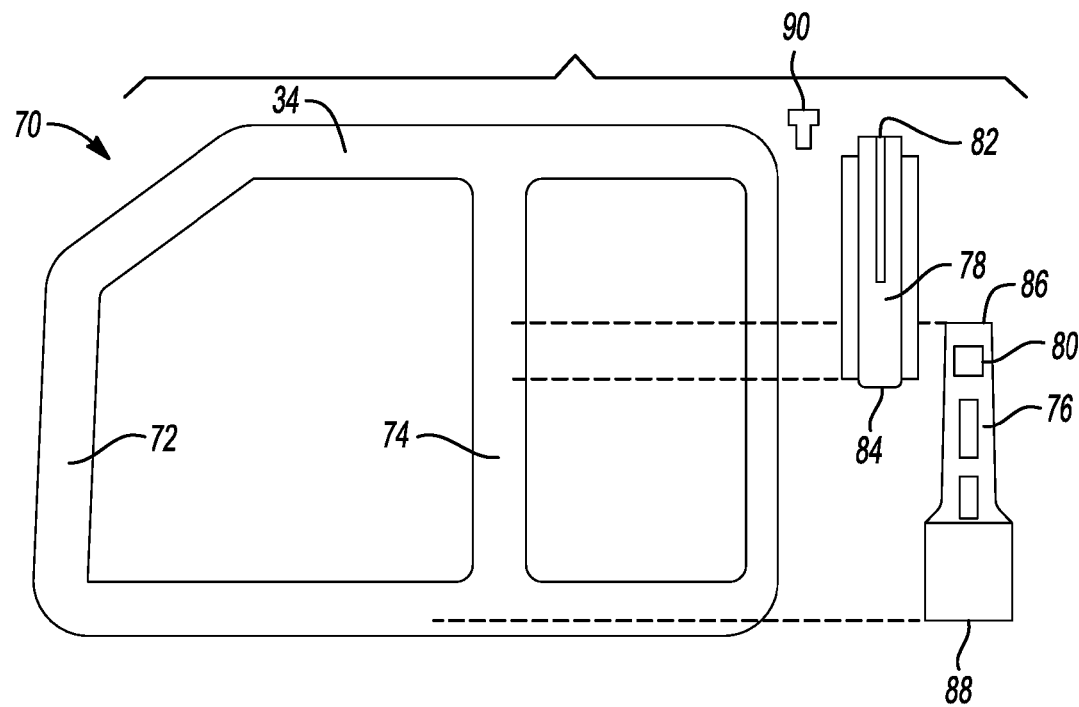
FIG. 5 is an exploded perspective view of side body assembly of a vehicle made according to an alternative embodiment of this disclosure.

Referring to FIG. 5, another alternative embodiment of a vehicle 70 is partially illustrated that includes a side body assembly 72. The outer panel 74 is shown as part of the side body assembly 72. A truncated inner panel 76 is provided that is attached to the extruded reinforcement 78. The inner panel 76 and reinforcement 78 overlap in the striker attachment area 80. The upper end 82 of the reinforcement 78 is attached to the roof rail 34 of the side body assembly 72. A lower end 84 of the reinforcement 78 extends to the striker attachment area 80 and is cut away to provide clearance for attaching the striker. An upper end 86 of the inner panel 76 also extends over the striker attachment area 80 and is joined by fasteners to the reinforcement 78. The reinforcement 78 in this embodiment takes the place of the inner panel 76 above the striker attachment area 80. The partial height inner panel 76 allows for additional weight reduction of the B-pillar assembly. The lower end 88 of the inner panel 76 is attached to the bottom portion of the side body assembly 72, or rocker assembly.

A junction bracket 90 is attached to the upper end 82 of the reinforcement 78 to provide additional strength.

The reinforcement 78 extends below the striker attachment area 80. The upper end 86 of the inner panel 76 is shown extending to a point above the striker attachment area 80.

Figure 6:
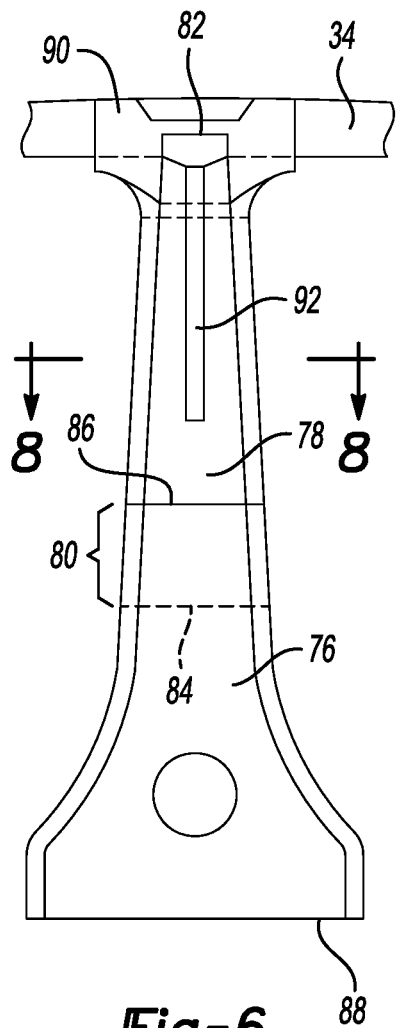
FIG. 6 is a side elevation view of a B-pillar assembly and junction bracket shown in FIG. 5.
Figure 7:
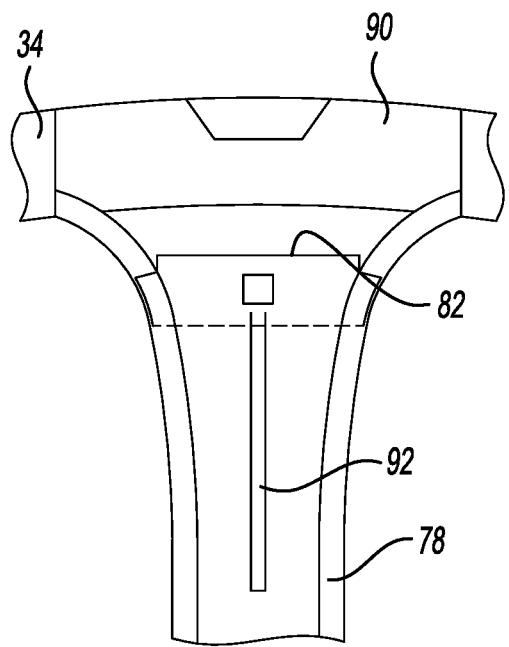
FIG. 7 is a fragmentary side elevation view of the top of a B-pillar assembly and junction bracket shown in FIG. 5.

Referring to FIGS. 6 and 7, a seat belt adjuster slot 92 is shown formed in the upper end 82 of the reinforcement 78. The upper end 82 of the reinforcement 78 is attached by the junction bracket 90 to the roof rail 34 of the side body assembly 72. The seat belt adjuster slot 92 extends downwardly from the upper end 82 to an intermediate point on the reinforcement 78. The seat belt adjuster slot 92 is adapted to receive a seat belt height adjustment mechanism (not shown) as previously described with reference to FIGS. 3 and 4.

Figure 8:
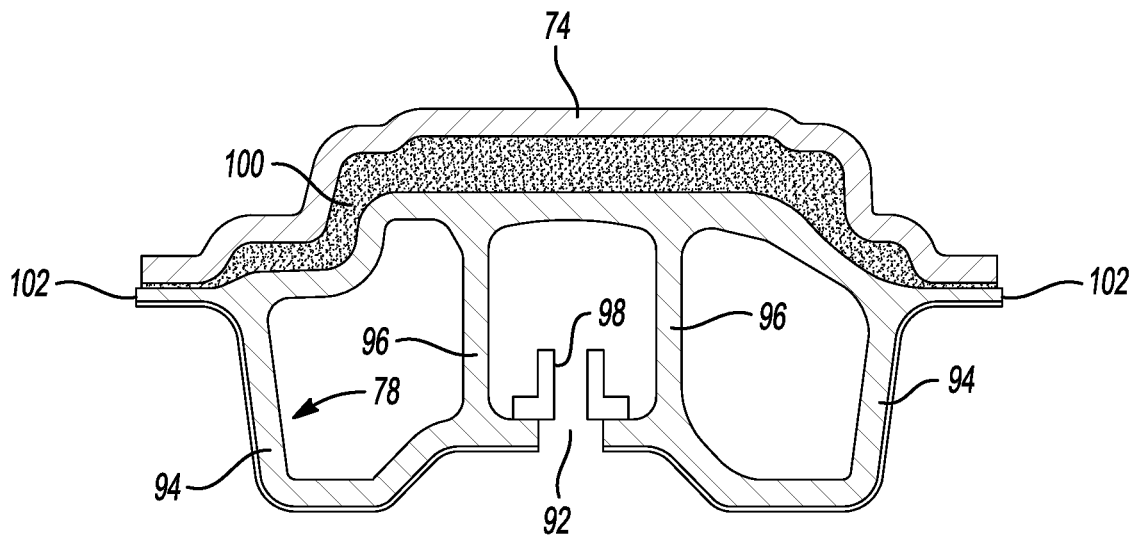
FIG. 8 is a cross-sectional view taken along the line 8-8 in FIG. 6.

Referring to FIG. 8, the reinforcement 78 is shown assembled to an outer panel 74 of the B-pillar assembly. The reinforcement 78 includes a peripheral wall 94 and two internal walls 96 that divide the reinforcement 78 into three cells as previously described with reference to the embodiment of FIG. 4. The central cell includes the seat belt adjuster slot 92 that is backed by an adjuster track reinforcement 98. The adjuster track reinforcement 98 is aligned with the seat belt adjuster slot 92 and is adapted to receive and guide movement of the seat belt adjuster (diagrammatically shown in FIG. 4).

The outer panel 74 is attached with an adhesive 100 to the reinforcement 78. The reinforcement 78 is attached at the side flanges 102 to the outer panel 74 with fasteners that only require single sided access to the parts.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pillar for a vehicle comprising:
   an outer panel;
   an inner panel; and
   a reinforcement attached between the inner and outer panels, the reinforcement extending from an upper end of the inner panel to a striker attachment area on the outer panel, wherein a lower end of the reinforcement is spaced from the inner panel, wherein the reinforcement defines a plurality of closed cells with a plurality of walls extending in a vertical direction between the lower end of the reinforcement and an upper end of the reinforcement, and wherein the lower end of the reinforcement is trimmed at an angle from an outer side of the lower end of the reinforcement proximate the outer panel to an intermediate location on an inner side of the reinforcement proximate the inner panel.

2. The pillar of claim 1 wherein the closed cells at the lower end of the reinforcement are open on an inner side of the reinforcement.

3. The pillar of claim 1 further comprising:
   a front flange extending forward of a body portion of the reinforcement and a rear flange extending rearward from the body portion.

4. The pillar of claim 3 wherein the front flange and the rear flange extend from the upper end of the reinforcement to an intermediate location the reinforcement above the striker attachment area on the outer panel.

5. A pillar for a vehicle comprising:
   an outer panel;
   an inner panel extending from a lower end of the inner panel to an upper end at a first height of a top of a striker attachment area of the outer panel; and
   a reinforcement attached between the inner and outer panels, the reinforcement extending from an upper end of the inner panel to a lower end at a second height of a bottom of the striker attachment area on the outer panel, wherein a lower end of the reinforcement overlaps the upper end of the inner panel.

6. The pillar of claim 5 wherein the reinforcement above the upper end of the inner panel is joined to the outer panel and wherein the inner panel does not extend above the first height.

7. The pillar of claim 5 further comprising:
   a junction bracket attached to the upper end of the reinforcement that is adapted to be attached to a roof rail of the vehicle.

8. The pillar of claim 5 wherein the reinforcement defines a plurality of closed cells with a plurality of walls extending in a vertical direction between the lower end of the reinforcement and an upper end of the reinforcement.

9. The pillar of claim 5 wherein the lower end of the reinforcement is trimmed at an angle from an outer side of the lower end of the reinforcement proximate the outer panel to an intermediate location on an inner side of the reinforcement proximate the inner panel.

10. The pillar of claim 5 wherein a plurality of closed cells at the lower end of the reinforcement are open on an inner side of the reinforcement.

11. A method of making a B-pillar for a vehicle comprising:
    forming an inner panel and an outer panel in a sheet metal forming operation;
    extruding a reinforcement;
    assembling the outer panel to a side body structure of the vehicle;
    assembling the reinforcement to an upper portion of the inner panel, wherein the upper portion extends from a top end of the inner panel to a striker receiving area of the outer panel; and
    assembling the inner panel and reinforcement to the outer panel.

12. The method of claim 11 further comprising:
    bending the reinforcement to a contour of the upper portion of the inner panel.

13. The method of claim 11 further comprising:
    trimming at least one flange extruded on the reinforcement to conform to a width of the inner panel in a fore-and-aft vehicle direction.

14. The method of claim 11 further comprising:
    riveting the reinforcement to the inner panel.

15. The method of claim 11 further comprising:
    forming a junction bracket in a sheet metal forming operation; and
    assembling the reinforcement to the junction bracket.

* * * * *